United States Patent [19]

Postupack et al.

[11] 4,139,652

[45] Feb. 13, 1979

[54] SOLVENT SYSTEM FOR ELECTROSTATIC SHADE BAND DEPOSITION PROCESS

[75] Inventors: Dennis S. Postupack, Natrona Heights; David A. Allerton, Glenshaw, both of Pa.

[73] Assignee: PPG Industries, Inc., Pittsburgh, Pa.

[21] Appl. No.: 856,150

[22] Filed: Nov. 30, 1977

[51] Int. Cl.² .................... B05D 1/04; B05D 5/06; B05D 7/24
[52] U.S. Cl. .................................. 427/14; 427/27; 427/29
[58] Field of Search .......................... 427/14, 27, 29

[56] References Cited

U.S. PATENT DOCUMENTS

| | | | |
|---|---|---|---|
| 2,739,080 | 3/1956 | Woodworth | 427/164 |
| 2,914,373 | 11/1959 | Rieser | 8/4 |
| 3,008,858 | 11/1961 | Blake et al. | 8/4 X |
| 3,591,406 | 7/1971 | Moynihan | 427/280 |
| 3,973,058 | 8/1976 | Grover et al. | 427/163 |

*Primary Examiner*—James R. Hoffman
*Attorney, Agent, or Firm*—Donna L. Seidel

[57] ABSTRACT

An electrostatic spray process for the formation of a shade band on a polymeric innerlayer for laminated safety glass is disclosed. The improvement comprises using a solvent system of N-lower alkyl-pyrrolidone and tetrahydrofuran. This solvent system combines high dye solubility for process efficiency with proper volatility for optimum aesthetic quality in the finished product.

9 Claims, 2 Drawing Figures

SOLVENT SYSTEM FOR ELECTROSTATIC SHADE BAND DEPOSITION PROCESS

BACKGROUND

The present invention relates generally to the art of electrostatic spray methods and more particularly to the formation of colored shade bands on polymeric innerlayers for safety glass laminates.

In U.S. Pat. No. 3,973,058, Grover et al. disclose an improved printing method for tinting synthetic resin sheets used in the manufacture of laminated safety glass. The improvement comprises using an ink containing 12 to 35 percent by weight of one or more dyes dissolved in an N-lower alkyl-pyrrolidone solvent. The N-lower alkyl-pyrrolidone may be the sole solvent for the ink or may be the major component in a solvent system which contains minor amounts of a cosolvent selected from toluene, xylene, dialkyl formamides and dialkyl acetamides.

SUMMARY OF THE INVENTION

The present invention involves an electrostatic spray process for the formation of a colored area on a sheet of thermoplastic polymer to be laminated to glass for use as a safety windshield. The process is improved by employing a solvent system of tetrahydrofuran and N-methyl-pyrrolidone. The solvent system of the present invention combines high dye solubility for process efficiency with proper volatility for optimum aesthetic quality in the finished product.

According to the present invention, about 1 to 2 percent by weight of a mixture of dyes and up to about 6 percent of additives such as antioxidants and ultraviolet light stabilizers are dissolved in the solvent system. The resultant solution is sprayed onto a thermoplastic sheet until a desired luminous transmittance is achieved. The volatility of the solvent system is such that the shade band contains no undissolved dye particles physically bound to the innerlayer, a result of too volatile a solvent system; nor does the shade band have a mottled texture, the result of insufficient solvent volatility.

DESCRIPTION OF THE PREFERRED EMBODIMENT

Figure 1:
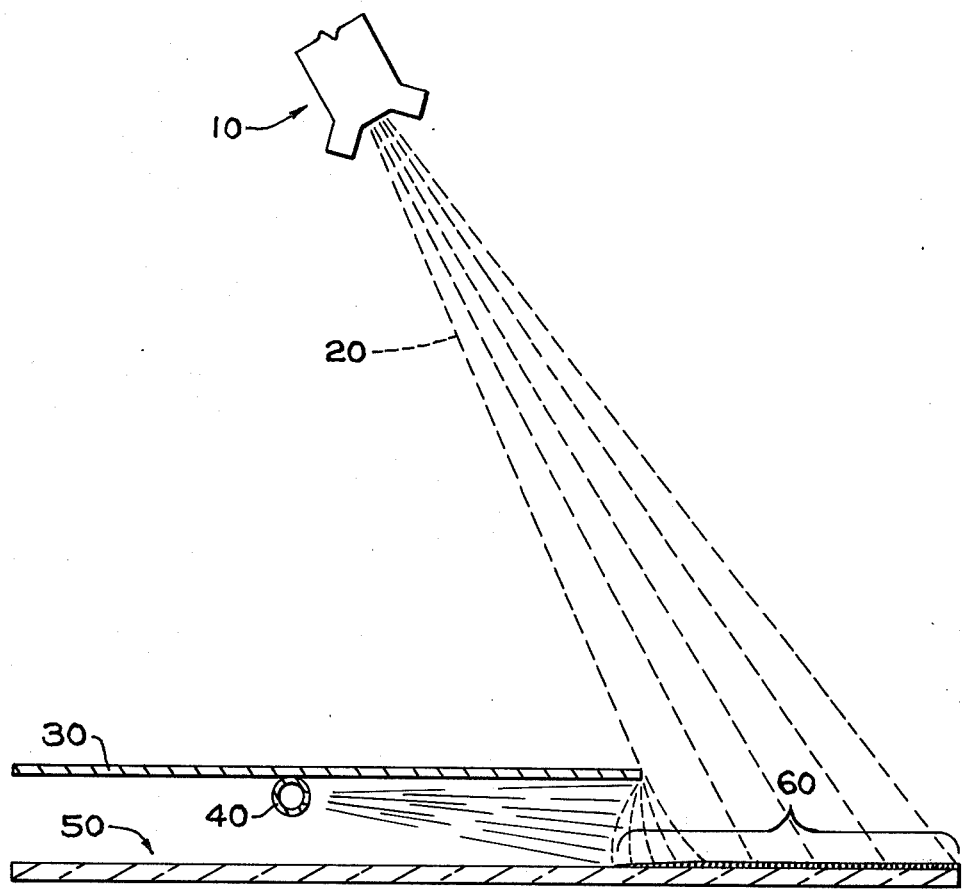
FIG. 1 is a fragmentary, schematic cross-sectional view of the relative positions of electrostatic spray means 10 for delivering atomized coating solution 20, a grounded shield 30, a fluid distribution manifold 40, and a substrate 50, onto the surface of which a shade band 60 is deposited.
Figure 2:
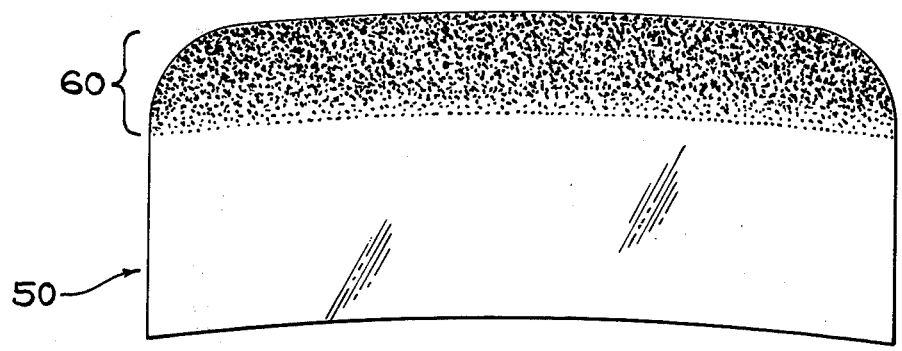
FIG. 2 depicts a finished article according to the present invention.

A colored band, preferably having a broad portion of uniform color intensity and a narrow portion of gradient intensity, is formed along an edge of a transparent, nonmetallic substrate which is subsequently laminated to another transparent substrate to form a laminated window. The substrate on which the colored band, referred to herein as a shade band, is formed may be either a sheet of glass, or a rigid transparent glass substitute such as polycarbonate or acrylic, or a thermoplastic polymeric innerlayer such as polyvinyl butyral or polyurethane. During the deposition of the shade band, the temperature of the substrate, particularly if it is glass, may be slightly elevated, preferably to about 38° C. The shade band may be formed on a rigid substrate and transferred to a thermoplastic substrate during lamination.

In a most preferred embodiment of the present invention, the shade band is deposited on a thermoplastic polymeric innerlayer which is subsequently laminated to glass to form a safety glass laminate. The shade band is formed by spraying an atomized coating solution is through electrostatic spray means positioned so as to deliver the atomized spray at an oblique angle to the portion of the substrate to be coated. Preferably, a shield is interposed between an electrostatic spray gun and the substrate to control the width of the gradient boundary portion of the shade band.

Preferably, the electrostatic spray apparatus comprises a manifold of non-electroconductive material between the shield and the substrate to apply a nonreactive fluid such as air from the manifold to an area beyond the edge of the shield in order to control the smoothness of the boundary and the texture of the gradient portion of the shade band. A detailed description of a preferred apparatus and method for employing the dye solution of the present invention is disclosed in U.S. Ser. No. 694,500 filed on June 10, 1976, and now abandoned, which description is incorporated herein by reference.

The electrostatic spray apparatus delivers to the substrate a dye solution comprising preferably about 1 to 2 percent by weight dye components in the solvent system of the present invention, which is a combination of tetrahydrofuran and N-lower alkyl-pyrrolidone, preferably about 75 to 85 percent by volume tetrahydrofuran and about 15 to 25 percent by volume N-methyl-pyrrolidone. This solvent system satisfies the requirements of high dye solubility, preferably greater than 2 percent, and proper volatility to assure optical uniformity in the shade band. Nonuniformity in the shade band is caused by both too low volatility, which results in a mottled texture, and too high volatility, which results in undissolved dye particles being physically bound to the surface of the substrate. This solvent system is also an acceptable solvent for the anti-oxidants and ultraviolet light stabilizers which are preferably added to the dye components.

Suitable dye solutions comprise a mixture of organic dye components, blended to yield a desirable color. A preferred dye mixture is a blend of blue, yellow and red-violet dye components. A preferred blue dye component comprises an anthraquinone derivative such as 1,4-diethylamino-anthraquinone. A preferred yellow dye component comprises a monoazo compound with a molecular formula of $C_{17}H_{16}O_2N_4$. A preferred red-violet dye component appears by infrared analysis to be an anthraquinone derivative comprising an amine functionality; however, positive identification was not obtainable. An appropriate blend of the preferred dye components, antioxidants and ultraviolet light stabilizers yields a relatively color fast blue-green colored shade band.

The present invention will be further understood from the descriptions of specific examples which follows:

EXAMPLE I

A dye composition is prepared comprising 38.5 percent by weight Solvaperm Red-Violet R, available from American Hoescht Corporation, 38.5 percent Calco Oil Blue N and 23.0 percent Calco Oil Yellow G Concentrate, both Calco dyes sold by American Cyanamid Company. A solution is prepared comprising 1.5 grams of the above dye composition per 100 milliliters of solvent. The solvent consists of 85 percent by volume tetrahydrofuran and 15 percent N-methyl-pyrrolidone. The above solution is electrostatically sprayed on an edge portion of a sheet of polyvinyl butyral to yield an optically uniform blue-green shade band.

EXAMPLE II

A dye composition is prepared as in Example I. A solution is made comprising 1.2 grams of the dye composition per 100 milliliters of a solvent system consisting of 80 percent by volume tetrahydrofuran and 20 percent by volume N-methyl-pyrrolidone. The solution further comprises, per 100 milliliters of solvent, 0.12 grams of an antioxidant, Irganox 1035, and 24 grams of an ultraviolet light stabilizer, Tinuvin 770, both available from Ciba-Geigy Corporation. The above solution is electrostatically sprayed as in Example I to yield a relatively colorfast optically uniform shade band.

The above examples are offered to illustrate the present invention which is not limited thereby. The scope of the present invention includes the formation of a shade band on materials other than polyvinyl butyral, such as polyurethanes or glass. Other dye components may be substituted for those specifically mentioned herein. N-lower alkyl-pyrrolidones include, in addition to N-methyl-pyrrolidone, compounds wherein the lower alkyl constituent contains up to about six, preferably up to about four, carbon atoms. The scope of the present invention is defined by the following claims.

We claim:

1. In a method for forming a colored portion on a transparent substrate by applying a dye solution to a surface of the substrate by electrostatic spray means, the improvement which comprises dissolving the dye components in a solvent comprising tetrahydrofuran and less than 50 percent by volume of N-lower alkyl-pyrrolidone.

2. The improved method according to claim 1, wherein the substrate is glass.

3. The improved method according to claim 1, wherein the substate is a sheet of thermoplastic polymer.

4. The improved method according to claim 3, wherein the solvent comprises from about 75 to about 85 percent by volume tetrahydrofuran and from about 15 to about 25 percent by volume N-methyl-pyrrolidone.

5. The improved method according to claim 4, wherein the solution comprises from about 1 to about 2 percent by weight dye components in a solvent consisting essentially of about 80 to 85 percent by volume tetrahydrofuran and about 15 to 20 percent N-methyl-pyrrolidone.

6. The improved method according to claim 5, wherein the solution comprises a blend of blue, yellow and red-violet dye components.

7. The improved method according to claim 6, wherein the blue dye component is 1,4-diethylamino-anthraquinone.

8. The improved method according to claim 6, wherein the yellow dye component is a monoazo compound of molecular formula $C_{17}H_{16}O_2N_4$.

9. The improved method according to claim 8, wherein the ratio of blue to yellow to red-violet dye components is about 1:1:0.6.

* * * * *